March 31, 1959   F. J. CASSIOPPI   2,879,710
LEMON SLICE SQUEEZERS
Filed Aug. 24, 1955
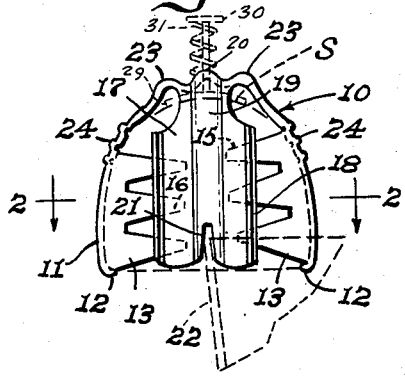
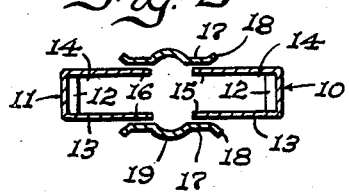
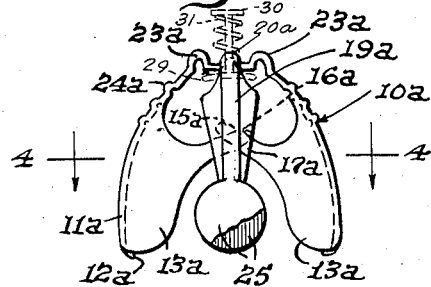
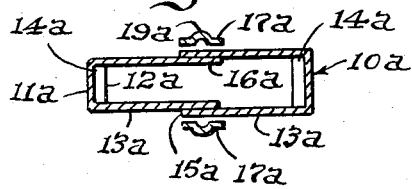
Inventor
Frank J. Cassioppi
Andrew F. Vintercorn
Atty

United States Patent Office 2,879,710
Patented Mar. 31, 1959

2,879,710

LEMON SLICE SQUEEZERS

Frank J. Cassioppi, Rockford, Ill.

Application August 24, 1955, Serial No. 530,357

9 Claims. (Cl. 100—234)

This invention relates to lemon slice squeezers designed to be worked between the thumb and forefinger of one hand, the same being particularly intended for use by bartenders, although such devices are, of course, also useful by diners.

The salient feature of the device of my invention is the provision of a U-shaped spring metal holder designed to surround the rind and having horizontally inwardly projecting fingers between which the pulp of the slice is supported against buckling during the squeezing out of the juice therefrom, the device being preferably also provided with vertically downwardly reaching fingers on opposite sides between which the horizontal fingers mentioned before are slidable as guides as the slice is squeezed, so that the first mentioned fingers do not deviate too far from their intended plane of operation and will not spread apart more than a predetermined extent in the compression of the slice.

The horizontal fingers on each side in one form are arranged to interfit and work in coplanar relationship, and in another form the horizontal fingers on each side are slidable on one another in parallel relationship, while in still another form the fingers on each side have sliding contact at least throughout a portion of the operation, the downwardly projecting guides on opposite sides being omitted with a view to greater economy and simplicity of construction.

Another feature of the present invention working alike in all of the three forms mentioned, is a rind ejector in the form of a plunger slidable radially inwardly from the middle portion of the squeezer against the resistance of a return spring, so that after the juice has been extracted and the squeezer is opened up again under its inherent spring tension the rind can be more readily removed preparatory to the insertion of another slice to be squeezed.

The invention is illustrated in the accompanying drawing, in which—

Fig. 1 is a side view of a lemon slice squeezer made in accordance with my invention;

Fig. 2 is a horizontal section on the line 2—2 of Fig. 1, and

Figs. 3 and 4 are views similar to Figs. 1 and 2 showing a modified or alternative construction.

Similar reference numerals are applied to corresponding parts throughout the views.

Referring first to Figs. 1 and 2, the dotted, substantially semi-circular object indicated at S may be taken to represent a lemon slice that has been placed in the squeezer indicated generally by the reference numeral 10, made in accordance with my invention. The squeezer 10 is preferably made from a single piece of stamped and formed sheet metal, the original blank being approximately in the form of a cross, two opposed arms of which are bent to define the generally U-shaped or semi-circular body 11 large enough to enclose therein a lemon slice in the manner indicated at S, the extremities of the arms of the U being bent inwardly, as indicated at 12, to define shoulders on which the ends of the slice will find sufficient support to prevent the slice from slipping out at either end when it is squeezed. The lateral edge portions of both arms of the U are bent inwardly, as indicated at 13, to form channels 14 in which the slice S is entered and held against lateral displacement. Elongated horizontal fingers 15 are provided on the one half of the body 11 on the portions 13 which, when the body 11 is compressed between the thumb and forefinger of one hand, are arranged to enter between similar fingers 16 provided on the other half on the portions 13, so that the pulp from which the juice is being extracted will not buckle but will be confined and subjected to compression so that the maximum amount of juice will be extracted. The body 11 is heat treated and tempered to have the desired springiness, so that it springs back to the open form of Fig. 1 after each lemon squeezing operation.

Figs. 3 and 4 show a modified form 10a, similar to the construction of Figs 1 and 2 in so far as the U-shaped body 11a having its inwardly bent side portions 13a defining channels 14a is concerned, the one channel being, however, slightly narrower than the other for the sliding of one side the other, as shown in Fig. 4. In this form, there are extensions 15a on the one half slidably interengaged with extensions 16a on the other half to serve as guides from the commencement of the compression of the slice to insure the smooth interfitting of one half in the other. Here again, the projections 12a serve to hold the slice in place at the ends so that it cannot slip out.

Referring back to Figs. 1 and 2, the other two opposed arms of the cross-shaped blank are bent inwardly to define a U and provide fingers 17 on the two legs of the U between which the two halves of the U-shaped body 11 operate in the squeezing of a lemon slice, so that even though the fingers 15 and 16 may be sprung apart to a certain extent in the compression of the pulp that will not interfere with efficient extraction of juice, because these fingers will then have sliding guiding contact with the fingers 17. The longitudinal edge portions 18 of the fingers 17 are preferably bent outwardly to guide the fingers 15 and 16 inwardly in the event the device has to be spread to an unusual extent to enclose a large slice, in which event the fingers 15 and 16 are apt to be disposed in laterally spaced relation to the edges of the fingers 17. The fingers 17 are, furthermore, preferably ribbed lengthwise, as indicated at 19, for reinforcement thereof to resist spreading apart of these fingers in the squeezing operation, the ribs 19 forming continuations of a transverse rib 20 at the middle of the body 11. If desired, the ribbed portions 19 may be cut away at the lower ends of the fingers 17, as indicated at 21, to define upwardly tapered slots adapted to receive the rim of a glass 22 with a wedging fit, so that the squeezer, with a slice inserted, may be placed on the rim of a glass where the bartender prefers to let the customer squeeze as much or as little of the juice into a drink as he prefers. The arcuate transverse ribs 23 defined on the body 11 on opposite sides of the rib 20 are provided to reduce likelihood of crystallization of the metal by reason of concentration of the flexing on one line on each side of the middle portion of the body 11. Smaller transverse ribs 24, are provided on opposite sides of the middle portion of the body 11 to serve as finger grips to reduce likelihood of slippage during the squeezing operation.

Referring again to Figs. 3 and 4, the squeezer 10a is similar to the squeezer 10 in having fingers 17a provided on opposite sides between which the two halves of the body 11a operate in the squeezing of a lemon slice. In this device, however, the lower end portions 25 of the fingers 17a are of enlarged circular form to serve to retain the lower middle portion of the slice against buckling outwardly in either direction in the squeezing of the slice. The fingers 17a have reinforcing ribs 19a longitudinally thereof, these ribs being continuations of a transverse rib 20a across the middle portion of the body 11a. The transverse ribs 23a on opposite sides of the rib 20a correspond to the ribs 23 in Fig. 1 and are provided for a similar purpose. Ribs similar to the ribs 24 in Fig. 1 may also be provided on the squeezer 10a, as indicated at 24a.

For ejection of the rind after juice extraction, there is provided on both forms a plunger 27 reciprocable in a hole provided in the middle of the body of the juice extractor and operating a curved elongated shoe 29 provided on the lower end thereof for engagement with the rind at the middle portion of a lemon slice, so that when the plunger 27 is pressed radially inwardly by thumb and finger pressure on the head 30 provided on the outer end of the plunger, a spent slice may be more easily dislodged from the squeezer preparatory to entry of another slice to be squeezed. A coiled compression spring 31 surrounds the plunger 27 between the head 30 and the outside of the body 11' and normally holds the shoe 29 in retracted position.

It is believed the foregoing description conveys a good understanding of the objects and advantages of my invention. The appended claims have been drawn to cover all legitimate modifications and adaptations.

I claim:

1. A citrus fruit slice squeezer comprising a body of spring material that is generally U-shaped in form and adapted to enclose a slice of citrus fruit to be squeezed by inward movement of the arms of the U-shaped body toward each other for juice extraction, the arms of the U-shaped body being arcuate and having inwardly projecting substantially parallel side walls defining channels therebetween on the inner sides of said arms in which to receive opposite end portions of a slice of citrus fruit and retain the same against displacement laterally during the squeezing operation, the inwardly projecting walls on each side of the channels being in substantially coplanar relationship and said walls having fingers that are long in relation to their width projecting inwardly therefrom, said fingers being sufficiently elongated to reach one another in the first stages of squeezing a slice of citrus fruit for juice extraction and arranged to interfit slidably when the arms of the U-shaped body are brought together in the final stages of the juice extraction.

2. A citrus fruit slice squeezer comprising a body of spring material that is generally U-shaped in form and adapted to enclose a slice of citrus fruit to be squeezed by inward movement of the arms of the U-shaped body toward each other for juice extraction, the arms of the U-shaped body being arcuate and having inwardly projecting substantially parallel side walls defining channels therebetween on the inner sides of said arms in which to receive opposite end portions of a slice of citrus fruit and retain the same against displacement laterally, and a pair of guide fingers which are of appreciable width in relation to their length and disposed in spaced parallel relation extending from opposite sides of the cross-portion of the U-shaped body in planes in close proximity to the outer side of the inwardly projecting side walls on the arms of the U-shaped body and arranged to be slidably engaged by the latter in surface to surface contact as guides in the operation of the device.

3. A device as set forth in claim 2 wherein said guide fingers have lateral edge portions which extend in outwardly diverging relation, whereby to facilitate entry of the inwardly projecting side walls on the arms of the U-shaped body between said fingers.

4. A device as set forth in claim 2 wherein the guide fingers have means reinforcing the same against spreading apart under outward pressure against them of the inwardly projecting side walls on the arms of the U-shaped body.

5. A device as set forth in claim 2 wherein the fingers are bifurcated to permit their straddling the edge portion of a drinking glass when the device is to be mounted on a glass.

6. A device of the character described comprising a generally U-shaped body of spring material adapted to enclose a slice of citrus fruit to be squeezed for juice extraction, the arms of the U-shaped body having inwardly projecting side portions defining channels on the inner sides of said arms in which to receive opposite end portions of a slice and retain the same against displacement laterally, the inwardly projecting side portions on each side of the channels being in substantially coplanar relationship and said side portions having fingers projecting inwardly therefrom and arranged to interfit slidably when the arms of the U-shaped body are brought together in squeezing a slice for extraction of juice therefrom, and a pair of guide fingers in spaced parallel relation extending from opposite sides of the cross-portion of the body in planes in close proximity to the inwardly projecting side portions of the arms of the U-shaped body and arranged to be slidably engaged by the first mentioned fingers as guides in the operation of the device.

7. A device as set forth in claim 6 wherein the lateral edge portions of said guide fingers extend in outwardly diverging relation.

8. A device as set forth in claim 6 wherein the guide fingers have means reinforcing the same against spreading apart under outward pressure against them of the first mentioned fingers.

9. A device as set forth in claim 6 wherein the guide fingers are bifurcated to permit their straddling the edge portion of a drinking glass when the device is to be mounted on a glass.

References Cited in the file of this patent

UNITED STATES PATENTS

| 726,075 | Kress | Apr. 21, 1903 |
|---|---|---|
| 946,668 | Filler | Jan. 18, 1910 |
| 1,190,177 | Knapp | July 4, 1916 |
| 1,417,619 | Male | May 30, 1922 |
| 1,530,340 | Blabb et al. | Mar. 17, 1925 |
| 2,184,454 | Hill | Dec. 26, 1939 |

FOREIGN PATENTS

| 40,647 | Austria | Jan. 25, 1910 |
|---|---|---|
| 195,614 | Germany | Feb. 21, 1908 |
| 221,984 | Germany | May 14, 1910 |